United States Patent [19]

Nomura et al.

[11] 4,209,564

[45] Jun. 24, 1980

[54] FLEXIBLE FOAMED PRODUCT WITH SKIN AND PROCESS FOR ITS MANUFACTURE

[75] Inventors: Takao Nomura, Toyota; Yoshio Taguchi, Nagoya; Kazuo Kobayashi; Isao Sakata, both of Toyota, all of Japan

[73] Assignee: Toyota Jidosha Kogyo Kabushiki Kaisha, Toyota, Japan

[21] Appl. No.: 23,251

[22] Filed: Mar. 23, 1979

[30] Foreign Application Priority Data

Sep. 4, 1978 [JP] Japan ............................ 53-108399

[51] Int. Cl.² .......................... B32B 3/26; B32B 5/18
[52] U.S. Cl. .................................. 428/315; 264/46.6
[58] Field of Search .................... 528/45; 264/46.6; 428/315, 425

[56] References Cited

U.S. PATENT DOCUMENTS

| | | | |
|---|---|---|---|
| 3,711,571 | 1/1973 | Farah | 528/45 |
| 3,873,407 | 3/1975 | Kumata et al. | 428/315 |
| 3,887,735 | 6/1975 | Laberinti | 428/315 |
| 4,009,133 | 2/1977 | Jones | 528/45 |
| 4,163,094 | 7/1979 | Turpin | 528/45 |

*Primary Examiner*—William J. Van Balen
*Attorney, Agent, or Firm*—Brisebois & Kruger

[57] ABSTRACT

A flexible foamed product with skin, characterized in that on the surface of the foamed product there is formed a skin composed of the reaction product of a linear urethane polymer, a polyol or an urethane prepolymer with an OH-terminal group compatible with the linear urethane polymer, and a blocked isocyanate; and the process for manufacturing such a product.

8 Claims, 1 Drawing Figure

FLEXIBLE FOAMED PRODUCT WITH SKIN AND PROCESS FOR ITS MANUFACTURE

BACKGROUND OF THE INVENTION

The present invention relates to a flexible foamed product with skin and a process for manufacturing such a product.

A two solution-reacting type urethane paint (a two-pack urethane paint) has been known as a skin composition which gives a highly chemical-resistant skin for a flexible foamed product. The skin obtainable from this paint, however, is usually lacking in elongation and flexibility; is poor in light-fastness and heat resistance; its elongation drops greatly and its discoloration is great after an aging test. When the reactivity of the two solutions-reacting type urethane paint is increased, it has the drawback that its pot life is reduced and its storage stability is decreased; but if its reactivity is decreased, its curing time is extended and as a consequence the number of molds which must be employed for molding is increased, resulting in an increased cost.

Also, as a paint with good workability and productivity which yields a highly flexible skin, a one solution type urethane paint which is a linear urethane polymer dissolved in an organic solvent has been known, but the skin obtainable from this paint, as might be expected, possesses poor resistance to solvents and chemicals and its physical properties after light-fastness tests are poor. Some of these drawbacks of the linear urethane polymer may be eliminated by increasing its molecular weight and its intermolecular entanglement (method "a"), but this method gives an insufficient improvement in chemical resistance and with this method a sprayed paint often leaves a trail. Therefore, in order to obtain a good skin the nonvolatile content of paint (NV-value) has to be substantially reduced. Another method (b) is available for this purpose, according to which a component of linear urethane polymer, mainly isocyanate, is replaced with a component which is, for example, more chemical-resistant. However, the skin obtainable in this case is usually intensely yellowed after light-fastness and heat resistance tests and dimethylformamide (DMF), which has a strong dissolving power and gives a harmful effect on the human body, must be used as the solvent for the paint. DMF produces an unfavorable work environment, evaporates slowly and takes a long time to dry.

A third method (c) is available, according to which a bifunctional or polyfunctional active isocyanate is employed for bridging the linear urethane polymer, but since the solvent of the linear urethane polymer usually contains an alcoholic solvent, the —OH group in the solvent and isocyanate react with each other, shortening the pot life and making the paint less workable. If a nonalcoholic solvent is selected to avoid this drawback, the solvent used must be DMF, which results in the same drawbacks that are noted above. Moreover, the active isocyanate is highly noxious to the worker and produces a bad environment for working and leads to low productivity.

What has been described above is summarized in Table 1, except that methods a, b, c and d are referred to as "remedys" a, b, c and d.

TABLE 1

| ITEM | | PAINT REMEDY | Two solutions-reacting urethane paint | | One solution type urethane polymer lacquer | | | |
|---|---|---|---|---|---|---|---|---|
| | | | Reactivity low | Reactivity high | No remedy | Remedy a | Remedy b | Remedy c |
| Physical Properties | Elongation (Flexibility) | | Δ ~ X | Δ ~ X | | | | ~ Δ |
| | Light-fastness | Elongation retained | Δ ~ X | Δ ~ X | Δ | ~ Δ | Δ | ~ Δ |
| | heat resistance | Discoloration | Δ ~ X | Δ ~ X | | | Δ ~ X | |
| | Chemical-resistance | | | | X | X ~ Δ | ~ Δ | ~ Δ |
| | Anti-scratch strength | | Δ ~ X | Δ ~ X | | | | |
| Productivity: etc. | Sprayability | | | | X | | | |
| | Storage stability | | Δ | X | | | | X |
| | Cycle time | | X | | | Δ | Δ | Δ |
| | Work environment | | Δ | Δ | | | X | XX |

Note:
— good
Δ— fair
X— poor

SUMMARY OF THE INVENTION

The primary object of the present invention is to provide a flexible foamed product with skin which excels in workability, productivity and resistance to chemicals and aging.

Another object of the present invention is to provide a flexible foamed product with skin which consists of a polyurethane with a network structure that excels in resistance to chemicals, solvents and aging.

Still another object of the present invention is to provide a method of manufacturing a flexible foamed product with skin which can be hardened in two stages.

Still another object of the present invention is to provide a method of manufacturing a flexible foamed product with a hardenable polyurethane skin which can be mass-produced without the use of a great number of molds for molding.

BRIEF ACCOUNT OF THE ATTACHED DRAWING

The attached FIGURE illustrates in a flow sheet format the manufacturing process according to the present invention.

DETAILED DESCRIPTION OF THE INVENTION

Figure 1:
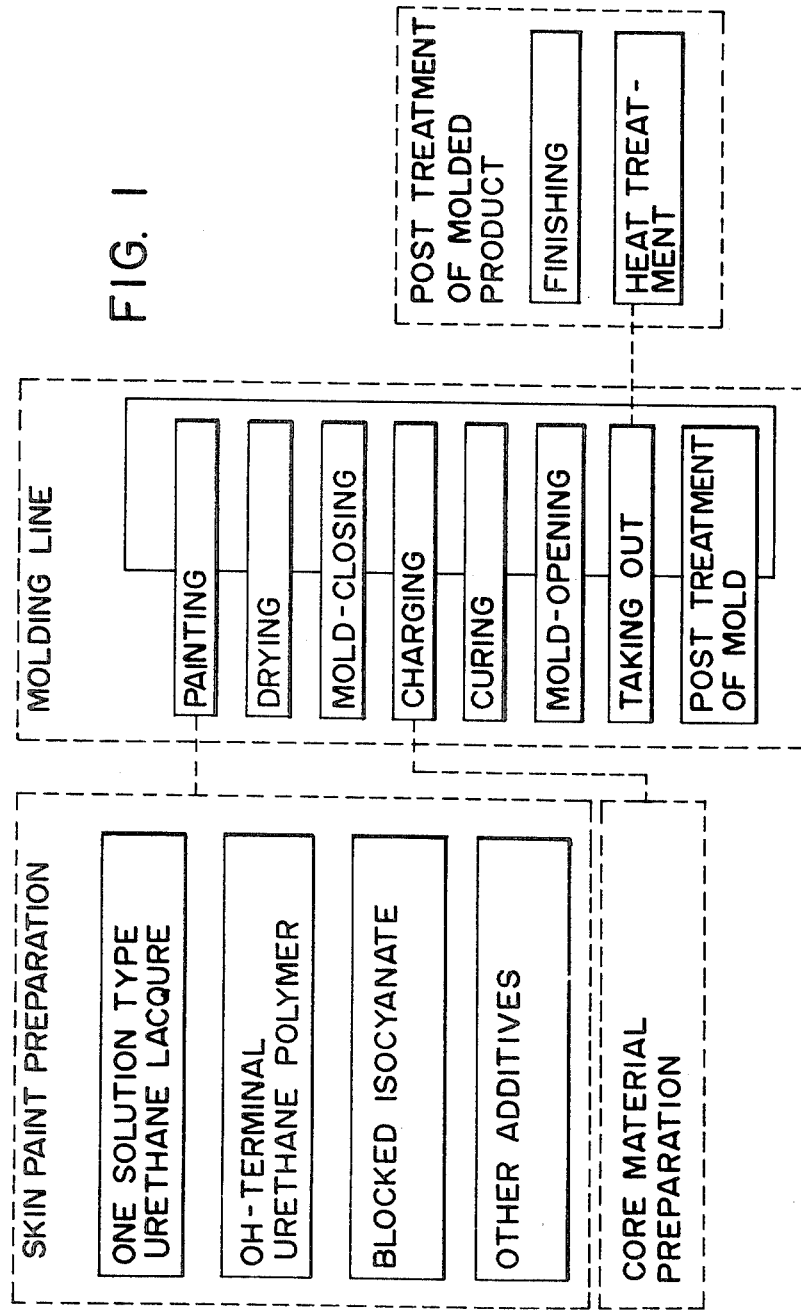

The present invention pertains to a foamed product with a skin of a paint which is the reaction product of (a) the conventional one solution type linear polyurethane paint, (b) a polyol or urethane prepolymer with an OH-terminal group compatible with said linear urethane polymer, preferably an urethane prepolymer with an —OH-terminal group having the same composition as said linear urethane polymer, and (c) a blocked isocyanate. The manufacturing process is characterized in that the skin paint preparations applied to the mold followed by a foaming step in which a foamed product with the primary dry film emerges out of the foaming mold; and then said film covered foamed product is heated to cause the blocked isocyanate in said film to react and fully cure, thereby yielding a foamed product with skin which is resistant to chemicals and aging.

In the present invention a thermoplastic urethane elastomer (linear urethane polymer) of weight average molecular weight 10,000–100,000 as dissolved in a solvent is employed as the one solution type polyurethane lacquer.

In this invention a bifunctional or polyfunctional blocked isocyanate with a block agent (cap agent)-dissociating temperature of 50°–200° C. is adopted, wherein at a temperature over about 130° C. phenol, i.e. the block agent is dissociated in accordance with the reaction formula: $C_2H_5C$ $(CH_2NHCOOC_6H_4CH_3 NHCOOC_6H_5)_3 \rightarrow C_2H_5C$ $(CH_2NHCOOC_6H_4CH_3-NCO)_3 + 3C_6H_5OH$, resulting in generation of active isocyanate. The blocked isocyanate is preferably added in an amount corresponding to a ratio of 1–30 parts by weight to 100 parts by weight of the thermoplastic urethane elastomer.

As the urethane prepolymer with —OH-terminal group or polyol to be used in this invention, a bifunctional or polyfunctional one with weight average molecular weight 5,000–50,000 is satisfactory and its addition is preferably in an amount corresponding to a ratio of about 1–50 parts by weight to 100 parts by weight of thermoplastic urethane elastomer.

The linear urethane polymer used as paint is that produced generally from ester polyol due to the physical properties (especially strength) requied therefor. Accordingly, generally speaking, the polyol which is compatible with the abovementioned linear urethane polymer each other is ester polymer. In this connection, however, it may be said that even the ether polyol is effective for the purpose of the present invention. For instance, the following examples are available as polyol in the present invention:

Preparation A:

Polyol which is prepared from adipic acid and ethylene glycol by the inventors of the present invention (weight average molecular weight 6,000; functional group 3 per molecule; hydroxyl value 28)

Preparation B:

Polyol which is prepared from adipic acid and 1,4-butanediol by the inventors of the present invention (weight average molecular weight 9,000; functional group 2 per molecule; hydroxyl value 12.5)

Preparation C:

Polyol "Sanix FA 901" manufactured by Sanyo Chemical Industries Ltd. (weight average molecular weight 7,000; functional group 3 per molecule; hydroxyl value 24)

As the solvent which may be used to dissolve the linear urethane polymer, for example, the following ones are available in the present invention.

Preparation D:

methyl cellosolve—4 parts by weight
dioxane—3 parts by weight
methylethyl ketone—3 parts by weight Preparation E:

toluene—2 parts by weight
isopropyl alcohol—1 part by weight

As for the conditions of heat treatment in this invention, the dissociating temperature differs depending on the blocked isocyanate employed and this temperature can be lowered through addition of a dissociation catalyst. For this reason there is no particular limitation to this temperature.

According to the present invention the reaction of the blocked isocyanate need not be completed before the formed product is demolded. The blocked isocyanate in this invention is dissociated through heat treatment into an active isocyanate and the block agent and this active isocyanate, further reacting with the linear urethane polymer and/or prepolymer and/or polyol forms a skin with good, new properties.

Referring now to the attached drawing, the flowsheet shows the manufacture of a flexible foamed product with skin according to the present invention, including the steps of skin paint preparation, core material preparation, the molding line and post treatment of the molded product. In this flowsheet the core material is shown as being charged into a closed mold on the molding line, but the charging may also be done with an open mold; in the latter case, the closing of the mold comes after the charging. The sequence of heat treatment and finishing in the post treatment of the molded product may be reversed. Skin Paint Preparation:

To a one solution type urethane laquer, which represents a linear urethane polymer of weight average molecular weight 10,000–100,000 composed of a bifunctional polyol, preferably polyester polyol, a bifunctional isocyanate, preferably non-yellowing isocyanate, etc., as dissolved in a soft solvent are added 1–50 parts by weight of a bifunctional or polyfunctional urethane prepolymer (OH-terminal urethane prepolymer) of weight average molecular weight 5,000–50,000 which is compatible with the linear urethane polymer, or polyol per 100 parts by weight of the linear urethane polymer and 1–30 parts by weight of a bifunctional or polyfunctional blocked isocyanate, for instance, with the formula $C_2H_5C(CH_2NHCOOC_6H_4CH_3 NHCOOC_6H_5)_3$, per 100 parts by weight of the linear urethane polymer; more preferably the blocked isocyanate is added in a heavy excess over its equivaltent, thereby yielding a skin paint. One "—NCO" equivalent in the blocked isocyanate (A) is about 314 and one —OH equivalent in the prepolymer with —OH terminal (B) is about 7,500. Therefore, (A) of 1 g is equivalent to (B) of about 24 g. In this preparation, 4.5 parts by weight of (A) is added to 1.8 parts by weight which is reduced into nonvolatile portion. Thus, the ratio of A/B in this preparation is 4.5/1.8 = 60/24 which amounts almost to 60 times as much as A/B in the case that (A) is equivalent to (B). It goes without saying that just like the conventional paint this paint can include a coloring agent or any other additive.

The above-mentioned "soft solvent" means the slovent used generally as thinner for paint other than powerful solvents harmful to human body such as dimethylformamide (DMF), dimethylsulfoxide (DMSO), etc. Benzene, toluene, xylene, isopropyl alcohol, butyl alcohol, methyl cellosolve, ethyl cellosolve, methylethyl ketone, methyl isobutyl ketone etc. are available as "soft solvent".

Core Material Preparation:

The composition of a conventional foamed plastic can be applied as it is. For instance, additives (such as catalyst, crosslinker, chain-extender, blowing agent)

may be blended with polyether polyol or polyester polyol and isocyanate (such as diisocyanate) at the customary mixing ratio and by the customary process.

Molding Line:

The skin paint is applied to the inside walls of the foaming mold, such as a resin mold or a metal mold, to a film thickness of about $50\mu$ (painting step) and the film is dried (drying step). The drying step may be omitted, depending on the circumstances. After drying the mold is closed (mold-closing step) and a foaming composition as the core material is charged into the mold (charging step). After charging, the core material is foamed and cured (curing step). Then the mold is opened (mold-opening step) to take out a molded product with a dry skin (take-out step). The mold, now devoid of the molded product, is treated with a demolding agent (post treatment of mold) and then returned to the painting step.

After the materials for skin with the composition given in Table 2 and the semihard polyurethane foam with composition given in Table 2 as core material are precisely measured, they are mixed quite well respectively and the former is placed into a paint tank and the latter into a raw material tank of high-pressure foaming machine.

Next, after mold releasing agent is coated on the mold which is preheated to 50°–60° C., the above-mentioned paint is coated by air spray gun so uniformly as possible so thick as to be about $50\mu$ in thickness after drying. The sprayed paint is dried at 80° C. for three minutes by a circulating hot air oven. After closing the mold, the above-mentioned urethane as core material is injected into the cavity of the closed mold by high-pressure foaming machine. The molding is cured by heating at 80° C. for 2 minutes in the circulating hot air oven. By opening the mold, the product is taken out therefrom. Thus taken-out product is finished and the skin material is cured by heating at 155° C. for about 45 minutes in the circulating hot air oven.

Post Treatment of Molded Product:

The molded product thus taken out is heated at a specified temperature between 50° and 200° C. and preferably 145°–160° C. for a specified time, preferably 30–90 minutes (heat treatment) to cause the blocked isocyanate to react and form a hardened skin. Then it is finished (finishing step) yielding a flexible foamed product with skin according to the present invention.

Molded, foamed products obtained using the "sample I" of skin paint composed of only a linear urethane polymer solution and samples "II" and "III", which had the compositions given in Table 2, were put to chemical resistance tests, the results being summarized in Table 3; and only the skins obtained from these samples were put to physical properties tests, the results being summarized in Table 4.

TABLE 2

| Materials \ Samples | I (control) | II (invention) | III (invention) | Remarks |
|---|---|---|---|---|
| Linear urethane polymer solution | 100 | 100 | 100 | * |
| OH-teminal urethane prepolymer solution | 0 | 1.5 | 3.0 | ** |
| Blocked isocyanate | 0 | 3.0 | 4.5 | *** |
| Pigment | 1.5 | 1.5 | 1.5 | |
| Additive | 0.15 | 0.15 | 0.15 | **** |
| Thinner | 200 | 200 | 200 | |

(unit: part by weight)
* weight average molecular weight about 50,000; 30% solution
** bifunctional, weight average molecular weight about 15,000; 60% solution
*** $C_2H_5C(CH_2NHCOOC_6H_4CH_3NHCOOC_6H_5)_3$
**** ultra violet ray absorber/anti-oxidant = 50/50

Note:
30% solution - solution consisting of 30 parts by weight of the linear urethane polymer and 70 parts by weight of thinner having the composition of methyl cellosolve: MEK(methylethyl ketone):dioxane = 4:3:3
60% solution - solution consisting of 60 parts by weight of the urethane prepolymer with —OH terminal and 40 parts by weight of thinner of the above-mentioned composition

TABLE 3

| | | Sample* | Rating standards** | |
|---|---|---|---|---|
| Chemicals | Test items | I (control) | II (invention) | III (invention) |
| Hair-dressing agent | Colored degree of white cotton cloth | 2 | 5 | 5 |
| | Degree of wear | 3 | 5 | 5 |
| Gasoline | Colored degree of white cotton cloth | 2 | 4 | 4 |
| | Degree of wear | 4 | 5 | 5 |

* skin 50 $\mu$ thick; core about 5 mm thick
** 5 is the rating at which no change is recognized.
4 is the rating at which a change is recognized but not prominent.
3 is the rating at which the change is slight but prominent.
2 is the rating at which the change is rather considerable.
1 is the rating at which the change is considerable.
Note: The test procedure is described below.

Test Procedure:

A molded product with the skin on top was placed in the friction tester of the Japan Science Promotion Society type. It was put to a 50-cycle abrasion test using a chemical-impregnated white cotton cloth (hair-dresser or gasoline) attached to the abrasive piece which was loaded with 500 g. The colored degree of the white cotton cloth was estimated from the dirtiness of the white cotton cloth. The degree of wear was determined from the surface of the molded product.

TABLE 4

| | Tests | Before test | | | After light-fastness test | | | After heat resistance test | | |
|---|---|---|---|---|---|---|---|---|---|---|
| Properties | Sample | I | II | III | I | II | III | I | II | III |
| 20% modulus (kg/mm$^2$) | | 0.94 | 1.04 | 0.99 | 0.76 | 1.00 | 1.02 | 0.94 | 1.18 | 1.23 |
| 100% modulus (kg/mm$^2$) | | 1.19 | 1.32 | 1.26 | 0.92 | 1.27 | 1.33 | 1.14 | 1.45 | 1.56 |
| 300% modulus (kg/mm$^2$) | | 2.35 | 2.82 | 2.65 | 1.44 | 2.36 | 2.61 | 1.98 | 2.98 | 3.30 |
| Rupture strength (kg/mm$^2$) | | 4.34 | 4.10 | 4.07 | 1.56 | 3.03 | 3.50 | 2.97 | 3.94 | 4.03 |
| Strength retained (%) | | — | — | — | 36 | 74 | 86 | 68 | 96 | 99 |
| Elongation to rupture (%) | | 470 | 400 | 405 | 340 | 365 | 370 | 420 | 370 | 350 |
| Strength retained (%) | | — | — | — | 72 | 91 | 91 | 89 | 93 | 86 |
| Tear strength (kg/mm) | | 9.7 | 10.2 | 9.2 | 7.6 | 8.3 | 8.8 | 7.9 | 8.2 | 8.5 |

TABLE 4-continued

| | Tests | Before test | | | After light-fastness test | | | After heat resistance test | | |
|---|---|---|---|---|---|---|---|---|---|---|
| Properties | Sample | I | II | III | I | II | III | I | II | III |
| Strength retained (%) | | — | — | — | 78 | 81 | 96 | 81 | 80 | 92 |

Notes
1 Strength retained = (value after test)/(value before test) × 100
2 Light-fastness is tested by Sunshine Weatherometer with no raining, at black panel temperature 83° ± 3° C., for 400 hours.
3 Heat resistance is tested in a drying furnace of gear oven type at 120° C. for 400 hours.

As indicated in Table 3, the chemical resistance of the samples II and III prepared according to the present invention were far superior to that of the sample I, i.e., the control.

From Table 4 which shows that said samples II and III are superior in various properties to the sample I, it is surmised that a crosslinked structure has been formed through reacting the linear urethane polymer and the polyol or urethane prepolymer with an OH-terminal group with the active isocyanate which is generated.

Thus it is seen that the flexible foamed product with skin of the present invention is improved over the conventional one with respect to the physical properties of the skin.

According to the present invention, the chemical resistance can be imparted without sacrificing the properties of the skin obtained from the conventional one solution type urethane polymer lacquer and it is possible to improve the physical properties, such as light fastness and heat resistance.

Moreover, the present invention increases the productivity. The blocked isocyanate used in the present invention is inert at room temperature and accordingly the skin paint is highly stable in storage and permits the use of an alcoholic soft solvent. Thus the work environment does not deteriorate and the spray-ability of the paint is not impaired.

The linear urethane polymer by itself can form a skin with good properties, therefore even when the blocked isocyanate in the skin remains nonreacting after curing of the core material a molded product can be easily taken out of the foaming mold. Thus a simultaneous heat treatment of a number of products (e.g. 30) is possible and accordingly even a long time needed for post treatment of the products does not affect the molding cycle time.

What is claimed:

1. A flexible foamed product having a skin, said skin being the cured reaction product of
   (a) a linear urethane polymer,
   (b) a polyol or an urethane prepolymer with an OH-terminal compatible with said linear urethane polymer, and
   (c) a blocked isocyanate.

2. Product of claim 1 wherein said linear urethane polymer has a weight average molecular weight of 10,000-100,000.

3. Product of claim 1 wherein said blocked isocyanate is bifunctional or polyfunctional; and the block-dissociating temperature is 50°-200° C.

4. Product of claim 3 wherein said blocked isocyanate has a block-dissociating temperature of about 145°-160° C.

5. Product of claim 1 wherein said blocked isocyanate is added in 1-30 parts by weight to 100 parts by weight of the linear urethane polymer.

6. Product of claim 1 wherein said OH-terminal urethane prepolymer or polyol is bifunctional or polyfunctional with weight average molecular weight 5,000-50,000.

7. Product of claim 1 wherein said OH-terminal urethane prepolymer or polyol is added in 1-50 parts by weight to 100 parts by weight of said linear urethane polymer.

8. A method of making a flexible foamed product having a skin which comprises
   (1) applying to the inside walls of a mold a skin paint preparation comprising
      (a) a linear urethane polymer,
      (b) a polyol or an urethane prepolymer with an OH-terminal compatible with said linear urethane polymer, and
      (c) a blocked isocyanate,
   (2) charging into said mold a resin composition for core foaming, and
   (3) applying sufficient heat to the resulting molding so that said blocked isocyanate can react with the other components of said paint preparation.

* * * * *